United States Patent
Bozkurt et al.

(10) Patent No.: US 11,242,256 B2
(45) Date of Patent: Feb. 8, 2022

(54) MULTI-STAGE CALCINATION METHOD FOR MAKING HOLLOW SILICA SPHERES

(71) Applicant: Imam Abdulrahman Bin Faisal University, Dammam (SA)

(72) Inventors: Ayhan Bozkurt, Dammam (SA); Seyda Tugba Gunday Anil, Dammam (SA); Munirah Abdullah Almessiere, Dammam (SA); Sultan Akhtar, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 635 days.

(21) Appl. No.: 15/995,904

(22) Filed: Jun. 1, 2018

(65) Prior Publication Data
US 2019/0367376 A1    Dec. 5, 2019

(51) Int. Cl.
*C01B 33/12* (2006.01)
*C01B 33/18* (2006.01)

(52) U.S. Cl.
CPC ............ *C01B 33/18* (2013.01); *C01B 33/124* (2013.01); *C01P 2004/34* (2013.01);
(Continued)

(58) Field of Classification Search
CPC ....... C01B 33/18; C01B 33/00; C01B 33/124; C01P 2004/88; C01P 2004/34; C01P 2006/16; C01P 2006/12; C01P 2006/14; A61Q 19/007; A61Q 19/00; A61Q 1/06; A61Q 1/02; A61Q 1/00; A61K 2800/00; A61K 2800/41; A61K 2800/412; A61K 2800/26; A61K 2800/28; A61K 2800/40; A61K 2800/413; A61K 2800/43;
(Continued)

(56) References Cited

U.S. PATENT DOCUMENTS

| | | |
|---|---|---|
| 2015/0056438 A1 | 2/2015 | Lim et al. |
| 2017/0073237 A1 | 3/2017 | Lim et al. |

FOREIGN PATENT DOCUMENTS

| | | |
|---|---|---|
| CN | 101391776 A | 3/2009 |
| CN | 102020283 A | 4/2011 |

(Continued)

OTHER PUBLICATIONS

NPL: Mechanism of self-templating synthesis of monodispersed hollow silica nanospheres with tunable size and shell thickness, Chemical communications, Issue 23, 2007 pp. 2339-2341.*

(Continued)

*Primary Examiner* — Smita S Patel
(74) *Attorney, Agent, or Firm* — Oblon, McClelland, Maier & Neustadt, L.L.P.

(57) ABSTRACT

A method for forming hollow silica spheres by dissolving a hydrolyzable aryl silane in an aqueous solution of water and an acid to form a hydrolyzed silane solution, mixing the hydrolyzed silane solution with a hydroxide base to form a precipitate, and calcining the precipitate in a multi-stage calcination procedure that includes (a) heating to a first temperature of 180 to 240° C. with a first ramp rate of 3 to 10° C./min and holding the first temperature for 2 minutes to 2 hours, then (b) heating to a second temperature of 600 to 740° C. at a second ramp rate of 0.1 to 4° C./min, and holding the second temperature for 2 to 24 hours.

19 Claims, 9 Drawing Sheets

(52) U.S. Cl.
CPC ...... *C01P 2004/88* (2013.01); *C01P 2006/12* (2013.01); *C01P 2006/14* (2013.01); *C01P 2006/16* (2013.01)

(58) Field of Classification Search
CPC .......... A61K 2800/434; A61K 2800/42; A61K 2800/58; A61K 2800/59; A61K 8/11; A61K 8/25; A61K 8/585; A61K 8/8117; A61K 8/891; A61K 8/894; A61K 8/00
See application file for complete search history.

(56) References Cited

FOREIGN PATENT DOCUMENTS

| EP | 1922290 A2 * | 5/2008 | ............. C01B 33/18 |
|---|---|---|---|
| WO | 2007/021508 A2 | 2/2007 | |

OTHER PUBLICATIONS

Marini, Michele, et al. ; Functionally modified core-shell silica nanoparticles by one-pot synthesis ; Mar. 20, 2008 ; Abstract ; https://www.sciencedirect.com/science/article/pii/S0927775707009880.

Taniguchi, Yoshinao, et al. ; Postgrafting of vinyl polymers onto hyperbranched poly(amidoamine)-grafted nano-sized silica surface ; Mar. 29, 2005 ; Abstract ; https://www.sciencedirect.com/science/article/pii/S0032386105001485?via%3Dihub.

Sasidharan, Manickam, et al. ; Synthesis of mesoporous hollow silica nanospheres using polymeric micelles as template and their application as a drug-delivery carrier ; 2013 ; Abstract ; http://pubs.rsc.org/en/content/articlelanding/2013/dt/c3dt51267c/unauth#!divAbstract.

Hah, Hoe Jin, et al. ; Simple preparation of monodisperse hollow silica particles without using templates ; 2003 ; Abstract ; http://pubs.rsc.org/en/content/articlelanding/2003/cc/b301521a#!divAbstract.

Dend, Ziwei, et al. ; Hollow chitosan-silica nanospheres as pH-sensitive targeted delivery carriers in breast cancer therapy ; Apr. 12, 2011 ; Biomaterials 32 ; pp. 4976-4986.

Gorsd, Marina N., et al. ; Synthesis and Characterization of Hollow Silica Spheres ; 2015 ; Procedia Materials Science 8 ; pp. 567-576.

Yu, Faqi, et al. ; Facile synthesis of PDMAEMA-coated hollow mesoporous silica nanoparticles and their pH-responsive controlled release ; Feb. 17, 2013 ; Microporous and Mesoporous Materials 173 ; pp. 64-69.

Liu, Shiquan, et al. ; Preparation of hollow silica spheres with different mesostructures ; Sep. 14, 2007 ; Journal of Non-Crystalline Solids 354 ; pp. 826-830.

* cited by examiner

MULTI-STAGE CALCINATION METHOD FOR MAKING HOLLOW SILICA SPHERES

BACKGROUND OF THE DISCLOSURE

Technical Field

The present disclosure relates to a method of making hollow silica spheres. In particular, methods of making hollow silica spheres using a hydrolyzable aryl silane and a multi-stage calcination procedure.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In the recent years, hollow silica spheres (HSS) have emerged as a versatile material for many industrial, medical and scientific applications. Nanotechnology and nanoscience have been focusing on hollow particles with nanometer to micrometer dimensions. Metal based hollow nanostructures have received increasing attention because of their specific plasmonic properties [S. J. Oldenburg, R. D. Averitt, S. L. Westcott and N. J. Halas, Chem Phys Lett, 1998, 288, 243-247—incorporated herein by reference in its entirety], and catalytic activities [S. W. Kim, M. Kim, W. Y. Lee and T. Hyeon, J Am Chem Soc, 2002, 124, 7642-7643—incorporated herein by reference in its entirety] which are completely distinct from their solid counterparts. For instance, gold nanoshells have been applied for contrast enrichment in optical imaging and photothermal initiation in drug release applications [S. J. Oldenburg, J. B. Jackson, S. L. Westcott and N. J. Halas, Appl Phys Lett, 1999, 75, 2897-2899; S. R. Sershen, S. L. Westcott, N. J. Halas and J. L. West, J Biomed Mater Res, 2000, 51, 293-298; J. L. West and N. J. Halas, Curr Opin Biotech, 2000, 11, 215-217—each incorporated herein by reference in its entirety].

Hollow particles tend to have beneficial optical activities, thermal insulation, and low density and have been widely used in drug delivery [S. J. Oldenburg, R. D. Averitt, S. L. Westcott and N. J. Halas, Chem Phys Lett, 1998, 288, 243-247; S. W. Kim, M. Kim, W. Y. Lee and T. Hyeon, J Am Chem Soc, 2002, 124, 7642-7643—each incorporated herein by reference in its entirety], plasmonic applications [S. J. Oldenburg, R. D. Averitt, S. L. Westcott and N. J. Halas, Chem Phys Lett, 1998, 288, 243-247—incorporated herein by reference in its entirety], catalysis [S. W. Kim, M. Kim, W. Y. Lee and T. Hyeon, J Am Chem Soc, 2002, 124, 7642-7643—incorporated herein by reference in its entirety], bioencapsulation [S. M. Marinakos, M. F. Anderson, J. A. Ryan, L. D. Martin and D. L. Feldheim, J Phys Chem B, 2001, 105, 8872-8876; S. M. Marinakos, J. P. Novak, L. C. Brousseau, A. B. House, E. M. Edeki, J. C. Feldhaus and D. L. Feldheim, J Am Chem Soc, 1999, 121, 8518-8522—each incorporated herein by reference in its entirety], medical diagnostics [P. Tartaj, M. D. Morales, S. Veintemillas-Verdaguer, T. Gonzalez-Carreno and C. J. Serna, J Phys D Appl Phys, 2003, 36, R182-R197—incorporated herein by reference in its entirety], structural materials, and composite electronic materials [J. K. Cochran, Curr Opin Solid St M, 1998, 3, 474-479, M. Ohmori and E. Matijevic, J Colloid Interf Sci, 1992, 150, 594-598—incorporated herein by reference in its entirety].

Hollow silica particles are typically prepared by coating/depositing a silicon-containing material on the surface of a template, and then removing the used template, leaving behind only the silicon-containing material. This kind of template method generally employs organic spheres, inorganic particles, or metal crystals as the template [P. V. Braun and S. I. Stupp, Materials Research Bulletin, 1999, 34, 463-469; P. J. Bruinsma, A. Y. Kim, J. Liu and S. Baskaran, Chem Mater, 1997, 9, 2507-2512; F. Caruso, X. Shi, R. A. Caruso and A. Susha, Advanced Materials, 2001, 13, 740-744; D. H. W. Hubert, M. Jung and A. L. German, Advanced Materials, 2000, 12, 1291-1294; M. Jafelicci Jr, M. Rosaly Davolos, F. Jose dos Santos and S. Jose de Andrade, Journal of Non-Crystalline Solids, 1999, 247, 98-102; H. T. Schmidt and A. E. Ostafin, Advanced Materials, 2002, 14, 532-535; L. Wang, T. Sasaki, Y. Ebina, K. Kurashima and M. Watanabe, Chem Mater, 2002, 14, 4827-4832—each incorporated herein by reference in its entirety]. However, such template methods, commonly called "scarified template methods", require template removal after the coating process [T. Ung, L. M. Liz-Marzán and P. Mulvaney, Langmuir, 1998, 14, 3740-3748; Y. Yin, Y. Lu, B. Gates and Y. Xia, Chem Mater, 2001, 13, 1146-1148—each incorporated herein by reference in its entirety]. This can be both time consuming and wasteful, as the template is merely sacrificial and is not incorporated into the final product.

Recent efforts have been made to prepare hollow particles without templates, by using self-template methods or device-based approaches (called "nozzle based method") in order to avoid template waste. While such methods generally simplify the procedures for making hollow particles, they have not yielded satisfactory results.

In view of the forgoing, one object of the present disclosure is to provide methods for forming hollow silica spheres using multi-stage calcining procedures that eliminates the need for templates and forms robust hollow silica spheres with properties that enable their use in a wide variety of applications.

BRIEF SUMMARY OF THE DISCLOSURE

Accordingly, it is one object of the present invention to provide novel methods of forming hollow silica spheres using calcining procedures that eliminates the need for templates.

These and other objects, which will become apparent during the following detailed description, have been achieved by employing hydrolyzable aryl silanes and multi-stage calcining procedures for the production of hollow silica spheres having desirable monodispersity, uniformity, degrees of hollowness, mechanical properties, aqueous solubility, and surface characteristics.

Therefore, according to a first aspect, the present disclosure relates to a method for forming hollow silica spheres that involves (i) dissolving a hydrolyzable aryl silane in an aqueous solution comprising water and an acid to form a hydrolyzed silane solution, (ii) mixing the hydrolyzed silane solution with a hydroxide base to form a precipitate, and (iii) calcining the precipitate to form the hollow silica spheres, wherein the calcining is performed by (iiia) heating to a first temperature of 180 to 240° C. with a first ramp rate of 3 to 10° C./min and holding the first temperature for 2 minutes to 2 hours, then (iiib) heating to a second temperature of 600 to 740° C. at a second ramp rate of 0.1 to 4° C./min, and holding the second temperature for 2 to 24 hours.

In some embodiments, the hydrolyzable aryl silane is a trialkoxy(aryl) silane.

In some embodiments, the hydrolyzable aryl silane is trimethoxy(phenyl) silane.

In some embodiments, the acid is nitric acid.

In some embodiments, the hydroxide base is ammonium hydroxide.

In some embodiments, the first temperature is 195 to 210° C.

In some embodiments, the first ramp rate is 4 to 6° C./min

In some embodiments, the first temperature is held for 15 to 45 minutes.

In some embodiments, the second temperature is 650 to 670° C.

In some embodiments, the second ramp rate is of 1 to 2° C./min.

In some embodiments, the second temperature is held for 12 to 20 hours.

In some embodiments, a template is not employed for forming the hollow silica spheres.

In some embodiments, the hollow silica spheres comprise a silica-containing shell surrounding a core, wherein the silica-containing shell has a higher density of silica compared to the core.

In some embodiments, the hollow silica spheres have an average degree of hollowness, defined as a maximum peak intensity of the core divided by a minimum peak intensity of the silica-containing shell, each measured with transmission electron microscopy, of 3 to 8.

In some embodiments, the silica-containing shell has a thickness of about 150 to 210 nm, and the core has a diameter of about 100 to 230 nm.

In some embodiments, the hollow silica spheres have an average diameter of 500 to 530 nm.

In some embodiments, the hollow silica spheres are monodisperse with a coefficient of variation, defined as a ratio of the standard deviation to the mean diameter of the hollow silica spheres, of less than 5%.

In some embodiments, the hollow silica spheres have a solubility in water of 0.1 to 50 mg per 10 mL of water.

In some embodiments, the hollow silica spheres have a specific surface area of 350 to 450 m$^2$/g.

In some embodiments, the hollow silica spheres have a t-plot external surface area of 40 to 75 m$^2$/g.

In some embodiments, the hollow silica spheres have an average pore diameter of 1.7 to 8 nm with a cumulative pore volume of 0.02 to 0.035 cm$^3$/g.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
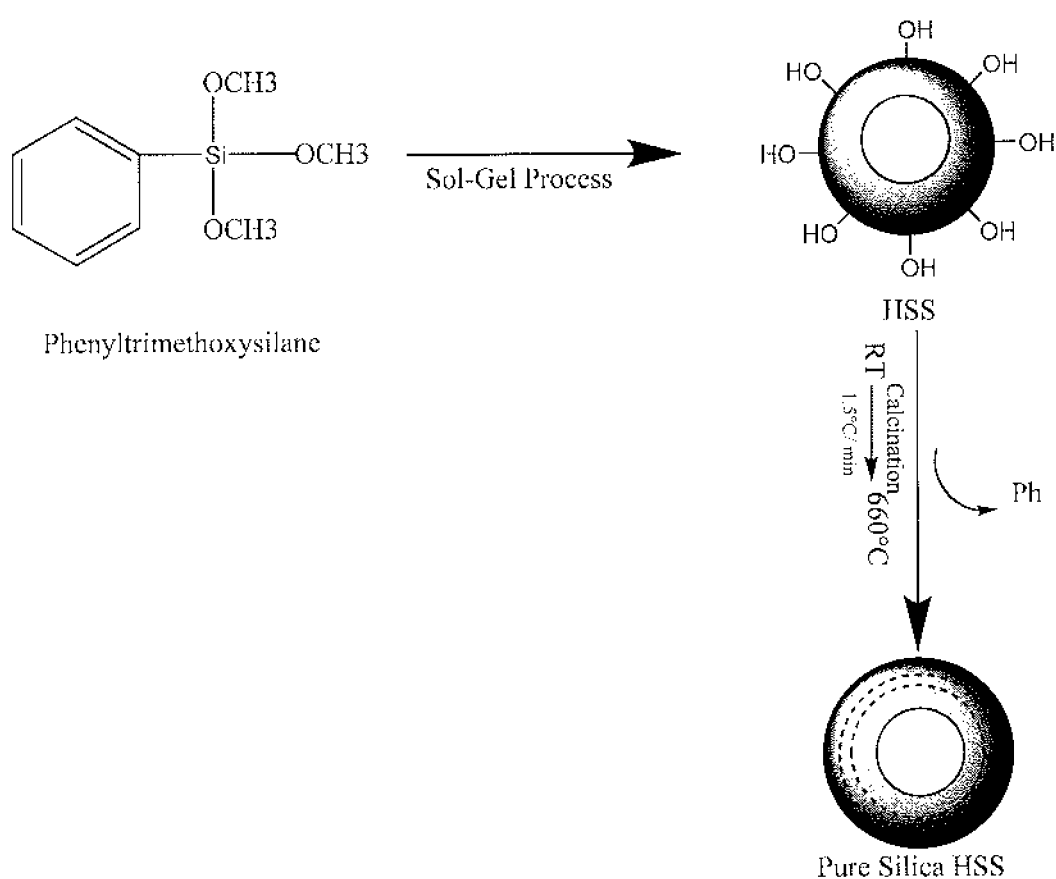
FIG. 1 is a schematic illustration of method used to synthesize, biocompatible HSS.

Embodiments of the present disclosure will now be described more fully hereinafter with reference to the accompanying drawings, in which some, but not all of the embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g. 0 wt. %).

The term "comprising" is considered an open-ended term synonymous with terms such as including, containing or having and is used herein to describe aspects of the invention which may include additional steps, components, functionality and/or structure. Terms such as "consisting essentially of" are used to identify aspects of the invention which exclude particular steps, components, functionality and/or structure that are not explicitly recited in the claim but would otherwise have a material effect on the basic and novel properties of the hollow silica spheres. The term "consisting of" describes aspects of the invention in which only those steps or features explicitly recited in the claims are included and thus other steps or components not explicitly or inherently included in the claim are excluded.

A weight percent of a component, unless specifically stated to the contrary, is based on the total weight of the formulation or composition in which the component is included. For example, if a particular element or component in a composition is said to have 8 wt. %, it is understood that this percentage is in relation to a total compositional percentage of 100%, unless stated otherwise.

In regard to calcination temperatures and procedures, the term "ramp" or "ramping" refers to a nonisothermal state where the temperature is varied in a particular direction (e.g., increased or decreased) over time, the purpose of which is to move from one temperature setting to another. On the other hand, the terms "held" or "holding" herein refer to an isothermal state where the referenced temperature (e.g., the first temperature or the second temperature) is maintained at a constant or near constant value (i.e., plus or minus 5° C., preferably plus or minus 4° C., preferably plus or minus 3° C., preferably plus or minus 2° C., preferably plus or minus 1° C.) for a certain period of time. For example, when the first temperature is selected to be 200° C., holding this first temperature for 25 to 35 minutes means that the temperature is maintained at 200° C. plus/minus 5° C. for a 25 to 35 minute time period before the temperature is subsequently changed. Therefore, the terms "held" or "holding" distinguish from nonisothermal states (i.e., during periods of temperature ramping) where the temperature is being raised or lowered at a particular ramping rate range. Again using the above example, when the temperature is being ramped from 150° C. to a target temperature of 250° C. over a certain time period, this scenario would not constitute a "hold" in temperature even though 200° C. may be transiently achieved in moving from 150° C. up to 250° C.

When referencing hollow silica spheres, "hollow" refers to a central area (i.e., a core portion) of a particle which has a lower density of silica compared to the surrounding structure (i.e., the shell portion). While the definition of "hollow" may encompass a continuous void that is completely free of silica, this is not a requirement, and some silica may be disposed within the core portion. By way of example, a silica particle which has a substantially continuous density of silica from one point on the particle though the center of the particle to a point directly across from it would be considered solid herein and not hollow, whereas a silica particle that has 60-80 wt. % of a total silica content located in the shell portion, with the remaining 20-40 wt. % of a total silica content located in the central area would be considered hollow herein.

Methods

According to a first aspect, the present disclosure relates to a method for forming hollow silica spheres (HSS), which first involves mixing and/or dissolving a hydrolyzable aryl silane in an aqueous solution comprising water and an acid to form a hydrolyzed silane solution.

The hydrolyzable aryl silane employed may be any silane having at least one aryl substituent and at least one hydrolyzable group bonded directly to the Si atom. Hydrolyzable groups include, but are not limited to, alkoxy groups (e.g., methoxy, ethoxy, propoxy, iso-propoxy, t-butoxy, as well as substituted variants, as well as mixtures of one or more of these groups) and halo groups (e.g., chloro, bromo, iodo, and fluoro), including mixtures of alkoxy and halo groups. The hydrolyzable aryl silane may therefore have one, two, or three hydrolyzable groups, preferably three hydrolyzable groups which may be the same or different, most preferably the same.

Likewise, the hydrolyzable aryl silane employed may have one, two, or three aryl groups, preferably one aryl group. In cases where the hydrolyzable aryl silane contains one aryl group, the hydrolyzable aryl silane may optionally include one or two alkyl or vinyl substituents bonded directly to the Si atom. The term "aryl", as used herein, and unless otherwise specified, refers to an aromatic group containing carbon in the aromatic ring(s), such as phenyl, biphenyl, naphthyl, anthracenyl, and the like, as well as optionally substituted analogs thereof. The term aryl is also meant to include "heteroaryl" groups, or aryl substituents where at least one carbon atom is replaced with a heteroatom (e.g. nitrogen, oxygen, sulfur) so long as the heteroatom is non-nucleophilic so as to prevent reaction with the hydrolyzable group of a neighboring hydrolyzable aryl silane. Such heteroaryl groups may include, pyridyl, pyrimidinyl, pyrazinyl, pyridazinyl, triazinyl, furyl, quinolyl, isoquinolyl, thienyl, imidazolyl, thiazolyl, indolyl, pyrroyl, oxazolyl, benzofuryl, benzothienyl, benzthiazolyl, isoxazolyl, pyrazolyl, triazolyl, tetrazolyl, indazolyl, 1,2,4-thia-diazolyl, isothiazolyl, purinyl, carbazolyl, benzimidazolyl, indolinyl, benzodioxolanyl, benzodioxane, and the like, as well as optionally substituted analogs thereof. The nitrogen and sulfur heteroatoms may optionally be oxidized (i.e., N→O and S(O)p, wherein p is 0, 1 or 2) or optionally protected with protecting groups as necessary as known to those skilled in the art, for example, as taught in Greene, et al., "Protective Groups in Organic Synthesis", John Wiley and Sons, Second Edition, 1991, hereby incorporated by reference in its entirety. The term "substituted" refers to at least one hydrogen atom that is replaced with a non-hydrogen group, provided that normal valencies are maintained and that the substitution results in a stable compound. When a compound is noted as "optionally substituted", the substituents are selected from the exemplary group including, but not limited to, alkyl, cycloalkyl, cycloalkylalkyl, arylalkyl, heteroaryl, aryl, heterocyclyl, alkoxy, cycloalkyloxy, aryloxy, arylalkyloxy, aroyl, alkanoyl, alkanoyloxy, carboxy, alkoxycarbonyl, halo (e.g. chlorine, bromine, fluorine or iodine), dialkylamino, diarylamino, arylalkylamino, alkanoylamino, nitro, cyano, carbamyl, alkylthio, arylthio, arylalkylthio, alkylsulfonyl (i.e. —SO$_2$alkyl), arylsulfonyl (i.e. —SO$_2$aryl), arylalkylsulfonyl (i.e. —SO$_2$arylalkyl), haloalkyl, oxo, and the like.

Exemplary hydrolyzable aryl silanes include, but are not limited to, ethoxy(diphenyl)vinyl silane, trichloro[4-(chloromethyl)phenyl] silane, dimethoxy(diphenyl) silane, diethoxy(diphenyl) silane, diethoxy(methyl)phenyl silane, trichloro(phenyl) silane, triethoxy(phenyl) silane, and trimethoxy(phenyl) silane.

In preferred embodiments, the hydrolyzable aryl silane is a trialkoxy(aryl) silane, more preferably a trialkoxy(phenyl) silane, most preferably trimethoxy(phenyl) silane.

It is also envisioned that hydrolyzable arylalkyl silanes may be used in addition to, or in lieu of the hydrolyzable aryl silane, whereby the aryl group is present but is bonded to the Si atom through an alkylene linking group. For example, trimethoxy(2-phenylethyl) silane may be used.

In preferred embodiments, the hydrolyzable aryl silane is the only source, reagent, or starting material used in the present disclosure to synthesize the hollow silica spheres that contains aryl functionality. In preferred embodiments, the hydrolyzable aryl silane is the only Si source utilized in the present method, and other sources of Si, for example tetraethyl orthosilicate (TEOS), may be optionally excluded.

Hydrolysis may be carried out by dissolving the hydrolyzable aryl silane in the aqueous solution comprising, consisting essentially of, or consisting of water and an acid with optional stirring and/or heating, for example, heating to a temperature of 30-100° C., preferably 40-90° C., preferably 50-80° C., preferably 55-65° C., preferably 60° C. The amount of the hydrolyzable aryl silane dissolved in the aqueous solution may be varied, although typically a volume ratio of the hydrolyzable aryl silane to the volume of the aqueous solution ranges from 1:50 to 1:100, preferably 1:60 to 1:95, preferably 1:70 to 1:90, preferably 1:75 to 1:85. The water may be tap water, distilled water, twice distilled water, deionized water, deionized distilled water, reverse osmosis water, or various other water sources.

The acid employed in the hydrolysis reaction is preferably a mineral acid such as hydrochloric acid, nitric acid, phosphoric acid, sulfuric acid, hydrobromic acid, perchloric acid, and hydroiodic acid. In preferred embodiments, the acid is nitric acid. A concentration of the acid in the aqueous solution may vary widely, but typical concentrations range from 1-15 mM, preferably 2-13 mM, preferably 3-11 mM, preferably 4-10 mM, preferably 5-9 mM, preferably 6-8 mM.

After combining the hydrolyzable aryl silane with the aqueous solution, the hydrolysis reaction is allowed to take place for an appropriate time to convert the hydrolyzable aryl silane into a partially or fully hydrolyzed form, whereby the hydrolyzable group (e.g., methoxy, chloro, etc.) is replaced by —OH, to form a hydrolyzed silane solution. In most cases, especially when heating is employed, less than 10 minutes, preferably less than 5 minutes, more preferably less than 3 minutes is enough to result in complete hydrolysis, although longer hydrolysis times may also be employed.

Once hydrolysis is deemed sufficiently complete, the hydrolyzed silane solution may be mixed with an appropriate hydroxide base to condense the hydrolyzed silane thereby forming a precipitate. The hydroxide base employed in the condensation reaction may be an alkali metal hydroxide (e.g., lithium hydroxide, sodium hydroxide, potassium hydroxide, rubidium hydroxide, and cesium hydroxide), an alkali earth metal hydroxide (e.g., magnesium hydroxide, calcium hydroxide, strontium hydroxide, and barium hydroxide), or an ammonium hydroxide (e.g., ammonium hydroxide, tetramethylammonium hydroxide, triethylammonium hydroxide, trimethylanilinium hydroxide, etc.). In preferred embodiments, the hydroxide base is ammonium hydroxide.

The hydroxide base may be used in the form of a solid such as a powder, beads or pellets, or may be used in the form of an aqueous base solution. When used as a solid, the hydroxide base is preferably in the form of beads or pellets, more preferably in the form of beads, and still more preferably in the form of beads having an average bead diameter of about 0.1 to 2 mm, preferably about 0.2 to 1.5 mm, more preferably about 0.5 to 1 mm. When the hydroxide base is used in the form of an aqueous base solution, the concentration thereof is preferably about 10 to 50%, preferably about 20 to 40%, more preferably about 30 to 35%, most preferably about 33%, by weight of hydroxide base per total volume of the aqueous base solution.

In some embodiments, an excess of hydroxide base is combined with the hydrolyzed silane solution. For example, a molar ratio of hydroxide base employed in the condensation reaction to the acid employed in the hydrolysis reaction may be about 100:1 to 1000:1, preferably 200:1 to 900:1, preferably 300:1 to 800:1, preferably 400:1 to 700:1, preferably about 500:1. Upon addition of the hydroxide base, a precipitate generally forms immediately at ambient temperatures (i.e., 20-25° C.), or alternatively upon optional heating to 30-80° C., or 40-70° C., or 50-60° C. The resulting suspension may be allowed to settle, or alternatively may be stirred, for example with a mechanical or magnetic stirrer.

The precipitate may then be separated from the suspension, for example by filtration, centrifugation, decantation, and the like, and optionally washed with an organic solvent, water, or both. Exemplary organic solvents may include, but are not limited to $C_1$ to $C_4$ lower alkanols, for example, methanol, ethanol, isopropanol, butanol; polyols and polyol ethers, for example, glycol, 1,3-propanediol, 1,3-butanediol, 2-butoxyethanol, propylene glycol, diethylene glycol, ethylene glycol monomethyl ether, and propylene glycol monomethyl ether. Afterwards, the precipitate may then be dried at a temperature of 20-150° C., preferably 50-120° C., preferably 60-100° C., preferably 80-90° C. under standard pressure or under vacuum. For examples of similar hydrolysis/condensation procedures, see [B. P. M. Marini, F. Pilati, and P. Fabbri, *Colloids Surf.*, 2008, A 317, (1-3); Y. Taniguchi, K. Shirai, H. Saitoh, T. Yamauchi and N. Tsubokawa, Polymer, 2005, 46, 2541-2547—each incorporated herein by reference in its entirety].

The method may next involve calcining the precipitate using a multi-stage calcining procedure, preferably a two-stage calcining procedure, to form the hollow silica spheres with advantageous properties as will be discussed hereinafter. In some embodiments, the calcination step is performed in a furnace using, for example, a pre-set temperature program discussed below, or using other variable temperature systems known by those of ordinary skill in the art.

In a first stage of the calcining process, the precipitate may be heated to a first temperature of 180 to 240° C., preferably 185 to 230° C., preferably 190 to 220° C., preferably 195 to 210° C., preferably about 200° C., with a first ramp rate of 3 to 10° C./min, preferably 3.4 to 9° C./min, preferably 3.6 to 8° C./min, preferably 3.8 to 7° C./min, preferably 4 to 6° C./min, most preferably about 5° C./min. Once the first temperature is reached, the first temperature may be held for 2 minutes to 2 hours, preferably from 10 minutes to 1.5 hours, preferably from 12 minutes to 1 hour, preferably from 14 to 55 minutes, preferably from 15 to 45 minutes, preferably from 20 to 40 minutes, preferably from 25 to 35 minutes, preferably about 30 minutes.

After holding the first temperature, the second stage of the calcining process may involve heating to a second temperature of 600 to 740° C., preferably 610 to 730° C., preferably 620 to 720° C., preferably 630 to 700° C., preferably 640 to 680° C., preferably 650 to 670° C., preferably about 660° C., with a second ramp rate of 0.1 to 4° C./min, preferably 0.3 to 3.5° C./min, preferably 0.5 to 3° C./min, preferably 0.8 to 2.5° C./min, preferably 1 to 2° C./min, most preferably about 1.5° C./min. Once the second temperature is reached, the second temperature may be held for 2 to 24 hours, preferably 4 to 23 hours, preferably 6 to 22 hours, preferably 8 to 21 hours, preferably 12 to 20 hours, preferably 14 to 18 hours, preferably 15 to 17 hours, most preferably about 16 hours to form the hollow silica spheres of the present disclosure.

In some embodiments, other stages may be incorporated into the multi-stage calcining program. For example a third stage may be added in between the first and the second stage that holds on a third temperature which is between the first and second temperatures (i.e., an intermediate stage). Likewise, a fourth stage may be added after the second stage to hold at a fourth temperature that is higher than that of the second temperature to finish the calcining program (i.e., a finishing stage). Various other stages may also be included, as well as other variations known for calcination processes, such as changes of gaseous atmosphere may be practiced.

As will become clear, the methods disclosed herein provide hollow silica spheres having unexpected and superior monodispersity, uniformity, degree of hollowness, mechanical properties, aqueous solubility, and surface characteristics compared to those produced without calcination and those produced using a single-stage calcination program.

Further, the methods described herein do not require the use of a template for forming the hollow spherical particles, and may thus be considered "template-free" methods. Many previous methods utilize a templating method that involves forming a sacrificial core, which can be pre-formed or formed in situ, that is coated with a silane. Then, after decomposing the core via chemical, thermal, or evaporative treatments, the core is removed and a silica shell is left behind. The material(s) used to construct such a sacrificial core is referred to as a "template", and may include organic solid particles, inorganic solid particles, emulsion droplets, vesicles, aggregates, and gas bubbles. Specific examples of templates include polystyrene particles, poly(vinylpyrrolidone) particles, polystyrene-containing co-polymers (e.g., PS-PVP co-polymers, PS-PVP-PEO triblock co-polymers), fatty amines (e.g., octylamine, dodecylamine), and the like, such as those described in EP1922290A2; Liu et al. "Preparation of hollow silica spheres with different mesostructures" Journal of Non-Crystalline Solids, 2008, 354, 826-830; Deng et al. "Hollow chitosan-silica nanospheres as PH-senstive targeted delivery carriers in breast cancer therapy" Biomaterials, 2011, 32, 4976-4986; Gorsd et al. "Synthesis and Characterization of Hollow Silica Spheres", Procedia Materials Science, 2015, 8, 567-576; Yu et al. "facile Synthesis of PDMAEMA-coated hollow mesoporous silica nanoparticles and their pH responsive controlled release", Microporous and Mesoporous Materials, 2013, 173, 64-69—each incorporated herein by reference in its entirety. In preferred embodiments, a template is not employed in the disclosed method for forming the hollow silica spheres, and most preferably, the hydrolyzable aryl silane is the only organic starting material employed.

The thus synthesized hollow silica spheres may be used 'as is', or may be further functionalized to suit a particular application, for example, for use in slow release or pH-responsive drug delivery applications or other carrier applications, biosensors, catalysis, cosmetics, adsorbent applications, fillers in polymer, building, or construction applications, etc. Indeed, the hollow silica spheres may be surface modified by coating/grafting with poly(N,N-dimethylaminoethyl methacrylate) (PDMAEMA), bi-reactive silanes such as gyycidyl-contianing silanes (e.g., (3-glycidyloxypropyl) trimethoxysilane (GTPMS)), cationic polysaccharide-chitosan, or various other coatings known by those or ordinary skill in the art.

Hollow Silica Spheres (HSS)

In some embodiments, the hollow silica spheres comprise a silica-containing shell surrounding a core, wherein the silica-containing shell has a higher density of silica compared to the core. The density of silica in the core and silica-containing shell portions can be determined by measuring the peak intensities of each with transmission electron microscopy, for example. The core may thus be defined as the central area in which the lower silica density begins, and which the higher silica density of the surrounding structure (i.e., the silica-containing shell) stops.

In some embodiments, the silica-containing shell comprises greater than 90 wt. % $SiO_2$, preferably greater than 95 wt. % $SiO_2$, preferably greater than 98 wt. % $SiO_2$, preferably greater than 99 wt. % $SiO_2$, preferably the silica-containing shell consists of or consists essentially of $SiO_2$.

Figure 4A:
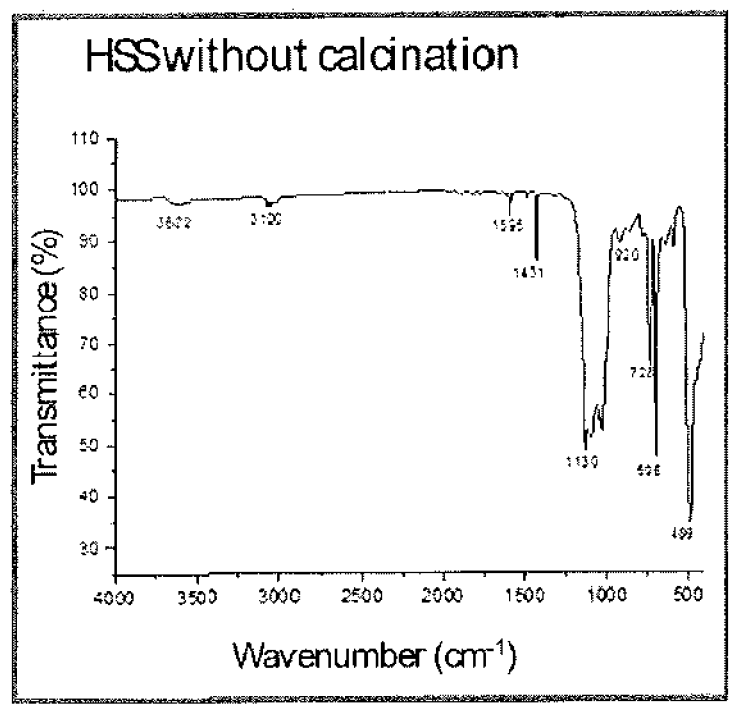
FIG. 4A shows an FTIR spectrum of non-calcined hollow silica particles.
Figure 4B:
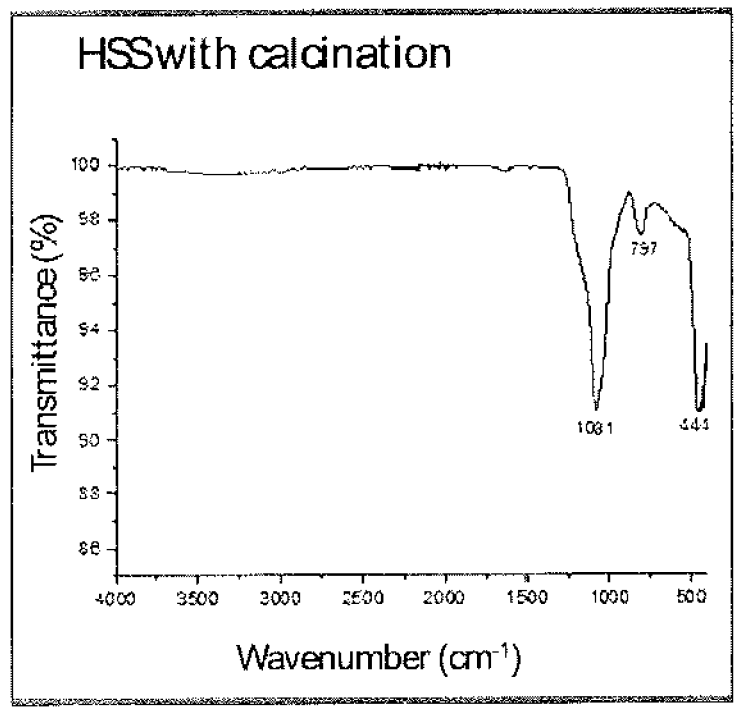
FIG. 4B shows an FTIR spectrum of calcined hollow silica particles.

In some embodiments, the calcining step removes most or preferably all aryl groups that originate from the hydrolyzable aryl silane, from the hollow silica spheres. FTIR can be used to determine the presence/absence of such aryl groups in the hollow silica spheres. As demonstrated by FIG. 4A, the presence of aryl C—H asymmetrical stretching vibration peak at about 3100 $cm^{-1}$ indicates the presence of aryl groups prior to calcination, while the absence of this peak after the calcining procedures described herein indicates removal of at least 90%, preferably at least 95%, preferably at least 99% by weight of the aryl groups (FIG. 4B)

Figure 2:
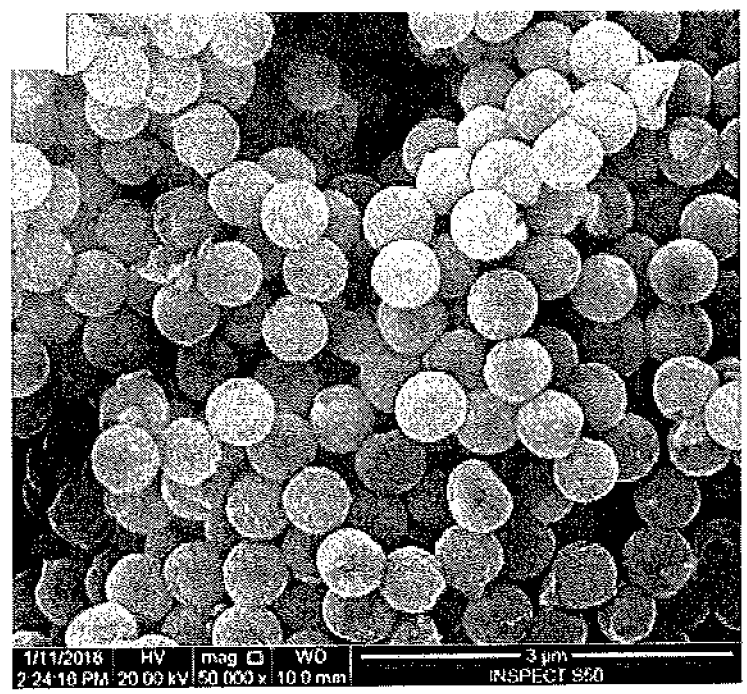
FIG. 2 is an SEM micrograph of HSS after calcination.
Figure 3A:
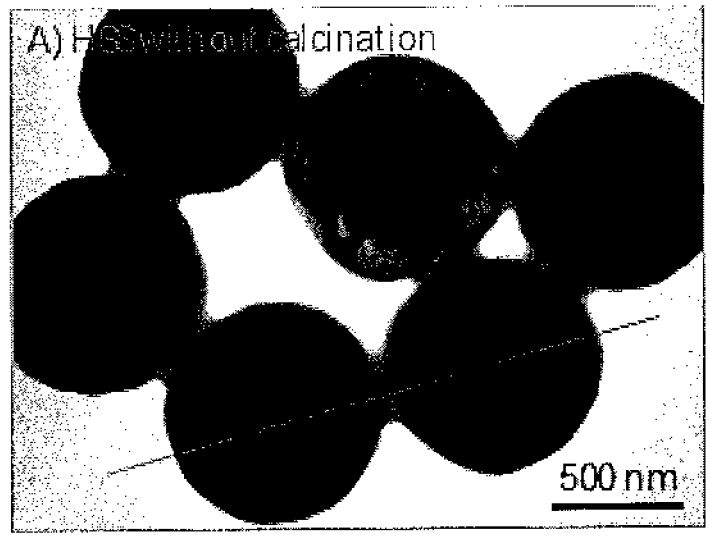
FIG. 3A is a TEM image of HSS spheres before calcination.
Figure 3B:
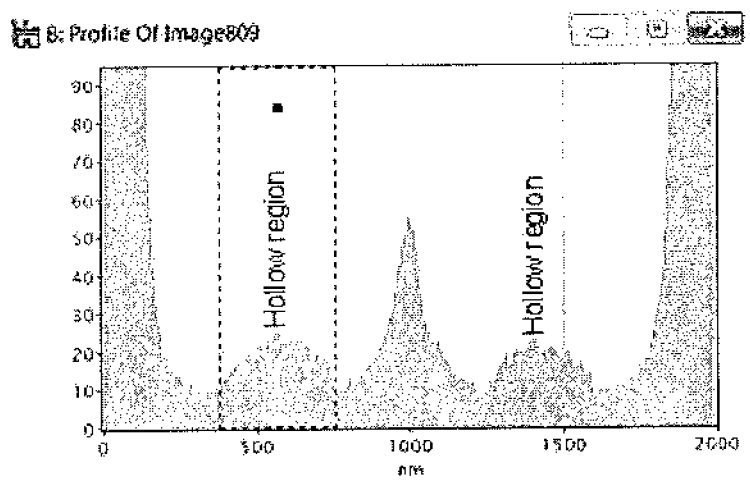
FIG. 3B is an intesity profile taken from the area shown by the line FIG. 3A.
Figure 3C:
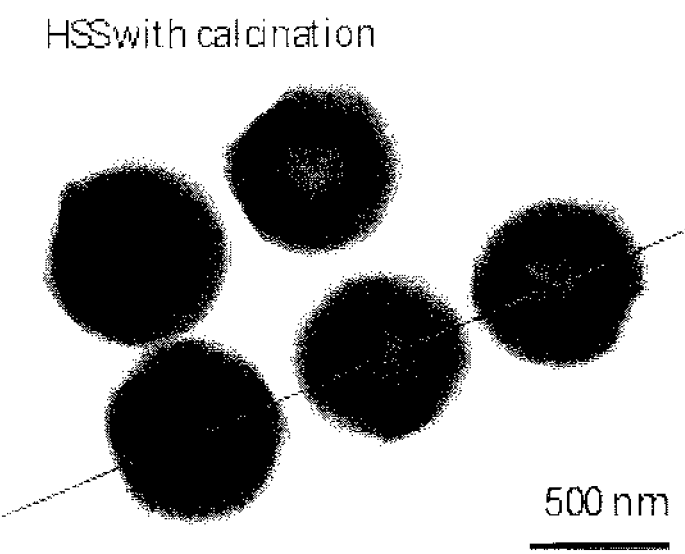
FIG. 3C is a TEM image of HSS spheres after calcination.

The shape of the core may generally determine the shape of the hollow silica spheres. In a preferred embodiment, the hollow silica spheres are spherical or substantially spherical. Sphericity is a measure of how closely the shape approaches that of a mathematically perfect sphere, and is defined as the ratio of the surface area of a perfect sphere having the same volume as a hollow silica sphere to the surface area of the hollow silica sphere (with unity being a perfect sphere). Preferably the hollow silica spheres have a high sphericity, with an average sphericity of at least 0.9, preferably at least 0.92, preferably at least 0.94, preferably at least 0.96, preferably at least 0.98, preferably at least 0.99. In some embodiments, the hollow silica spheres are classified based on roundness, and are categorized herein as being sub-rounded, rounded, or well-rounded, preferably well-rounded, using visual inspection similar to characterization used in the Shepard and Young comparison chart (FIGS. 2 and 3C).

Of course it is also envisaged that hollow silica particles may be manufactured in shapes other than spheres having high sphericities and roundness as described above. By way of example, particles may be produced in shapes such as rods, cylinders, rectangles, triangles, pentagons, hexagons, prisms, disks, platelets, cubes, cuboids, flakes, stars, flowers, and urchins (e.g. a globular particle possessing a spiky uneven surface).

In preferred embodiments, the methods disclosed herein produce hollow silica spheres which are uniform. As used herein, the term "uniform" refers to no more than 10%, preferably no more than 5%, preferably no more than 4%, preferably no more than 3%, preferably no more than 2%, preferably no more than 1% of the distribution of the hollow silica spheres having a different shape. For example, the hollow silica spheres are highly spherical (e.g., have an average sphericity of at least 0.9) and have no more than 1% of nanocomposite hollow particles in an oblong shape. Included in this definition of "uniform" is the degree in which the hollow silica spheres remain intact. In preferred embodiments, the silica-containing shell completely surrounds the hollow core, so that no fluid or compound may ingress into or egress out of the core except through pores located within the silica-containing shell. However, when a sphere is ruptured slightly so that silica-containing shell does not completely surround the core, the ruptured sphere tends to take on an appearance of a deflated, dimpled, or crumpled sphere, and thus tends to have a lowered sphericity (e.g., below that of 0.9). Similarly, when a significant rupture occurs, the spherical particles may take on the form of angular shards or fragments which have a substantially different shape than highly spherical particles. Therefore, uniformity may also be used to measure the mechanical resistance to rupture, with adequate uniformity (e.g., no more 10% of particles having a varied shape) being an indicator for high mechanical strength of the produced hollow silica spheres.

The "degree of hollowness" of the hollow silica spheres as used herein is in indicator of the density differential between the silica-containing shell and the core, with higher degrees of hollowness being associated with an increased capacity for storage (e.g., of pharmaceutical or cosmetic payloads), adsorption, etc. The degree of hollowness is defined as a maximum peak intensity of the core divided by a minimum peak intensity of the silica-containing shell, each of which are measured by transmission electron microscopy. That is, given the higher density of silica in the silica-containing shell than in the core, it is more difficult for a beam of electrons to pass through the silica-containing shell, resulting in intensity profiles that can be used to quantify this silica density disparity. For example, the dotted lines in FIGS. 3B and 3D signify the minimum peak intensity of the silica-containing shell of a hollow silica sphere, with the apex of intensity located in between the dotted lines signifying the maximum peak intensity of the core. The degrees of hollowness can then be calculated for the individual hollow silica spheres and averaged. In some embodiments, the hollow silica spheres produced herein have an average degree of hollowness of 3 to 8, preferably 3.2 to 7.5, preferably 3.4 to 7.0, preferably 3.6 to 6.5, preferably 3.8 to 6.0, preferably 4.0 to 5.5, preferably about 4.06. Such a degree in hollowness is much higher (i.e., more hollow) than silica spheres which have not been calcined, which have an average degree of hollowness of about 2.3. The difference in the degree of hollowness between hollow silica spheres produced by the inventive methods disclosed herein, and those which have been produced with the same process except without the calcination step can be clearly seen visually in FIGS. 3C and 3A, respectively.

In some embodiments, the silica-containing shell has a thickness of about 150 to 210 nm, preferably 160 to 200 nm, preferably 170 to 190 nm, preferably 180 to 185 nm. In some embodiments, the core has a diameter of about 100 to 230 nm, preferably 110 to 220 nm, preferably 120 to 210 nm, preferably 130 to 200 nm, preferably 140 to 190 nm, preferably 150 to 180 nm, preferably 160 to 170 nm. In preferred embodiments, the silica-containing shell is of "uniform thickness", meaning an average shell thickness that differs by no more than 10%, no more than 8%, no more than 6%, no more than 4%, preferably no more than 2%, preferably no more than 1% at any given location on the silica-containing shell.

In some embodiments, the methods herein produce hollow silica spheres with an average diameter of 490 to 540 nm, preferably 500 to 530 nm, preferably 505 to 525, preferably 510 to 520, with the diameter being the longest linear distance measured from one point on the particle though the center of the particle to a point directly across from it. Instead, when no calcination procedure is performed, the non-calcined silica spheres have much larger particle sizes, with an average diameter of about 760 nm.

"Dispersity" is a measure of the homogeneity/heterogeneity of sizes of particles in a mixture. The coefficient of variation (CV), also known as relative standard deviation (RSD) is a standardized measure of dispersion of a probability distribution. It is expressed as a percentage and may be defined as the ratio of the standard deviation ($\sigma$) to the mean ($\mu$, or its absolute value $|\mu|$), and it may be used to show the extent of variability in relation to the mean of a population. In a preferred embodiment, the hollow silica spheres of the present disclosure have a narrow size dispersion, i.e., are monodisperse, with a coefficient of variation of less than 30%, preferably less than 25%, preferably less than 20%, preferably less than 15%, preferably less than 12%, preferably less than 10%, preferably less than 8%, preferably less than 5%, preferably less than 3%, with the coefficient of variation being defined in this context as the ratio of the standard deviation to the mean diameter of the hollow silica spheres.

In some embodiments, the hollow silica spheres produced by the methods herein are in the form of distinct particles which are not present as agglomerates, meaning the hollow silica spheres are well-separated from one another and do not form clusters (FIG. 3C). On the other hand, non-calcined silica spheres are typically interconnected forming agglomerates made of two or more spheres that share an outer silica boundary (FIG. 3A).

The methods of the present disclosure advantageously produce hollow silica spheres having surface characteristics and porosities that make them suitable for use in a variety of applications, for example delivery, adsorption, biosensor, catalysis, and/or cosmetic applications. Such surface characteristics (e.g., specific surface area, Langmuir surface area, t-pot external surface area, etc.) and porosities (e.g., pore diameters, pore volume, etc.) can be measured, for example, using a gas sorption instrument such as a Micrometrics ASAP 2020 plus system (Micrometrics, USA). In some embodiments, the hollow silica spheres are produced with a specific surface area (BET surface area or multilayer adsorption) in the range of 350 to 450 m$^2$/g, preferably 360-440 m$^2$/g, preferably 370-430 m$^2$/g, preferably 380-420 m$^2$/g, preferably 390-415 m$^2$/g, preferably 400-410 m$^2$/g, preferably 405-408 m$^2$/g, preferably about 406 m$^2$/g. The specific surface area of the as produced hollow silica spheres is greater than the specific surface area of the non-calcined silica spheres, which is about 4-5 m$^2$/g.

In some embodiments, the hollow silica spheres have a Langmuir surface area (monolayer adsorption) of 550 to 700 m$^2$/g, preferably 560-690 m$^2$/g, preferably 570-680 m$^2$/g, preferably 580-670 m$^2$/g, preferably 590-660 m$^2$/g, preferably 600-650 m$^2$/g, preferably 610-640 m$^2$/g, preferably about 635 m$^2$/g. The Langmuir surface area of the hollow silica spheres produced with the inventive methods is therefore greater than the Langmuir surface area of the non-calcined silica spheres, which is about 7.5-8.5 m$^2$/g.

The t-plot method is a well-known technique which allows determining the external micro- and/or mesoporous volumes and the specific surface area of a sample by comparison with a reference adsorption isotherm of a non-porous material having the same surface chemistry. In some embodiments, the hollow silica spheres have a t-plot external surface area of 40 to 75 m$^2$/g, preferably 45 to 70 m$^2$/g, preferably 50 to 65 m$^2$/g, preferably 55 to 60 m$^2$/g, preferably about 58 m$^2$/g. On the other hand, non-calcined silica spheres have a t-plot external surface area of 5-6 m$^2$/g.

In preferred embodiments, the hollow silica spheres of the present disclosure have an average pore diameter of 1.7 to 8 nm, preferably 2.0 to 6 nm, preferably 2.1 to 4 nm, preferably about 2.2 nm, and a BJH adsorption cumulative pore volume (of pores between 1.7 nm and 300 nm) of 0.02 to 0.035 cm$^3$/g, preferably 0.024 to 0.030 cm$^3$/g, preferably 0.026 to 0.028 cm$^3$/g, or about 0.027 cm$^3$/g. In contrast, the average pore diameter and the BJH adsorption cumulative pore volume (of pores between 1.7 nm and 300 nm) for silica spheres which have not been calcined are 10-11 nm and 0.016-0.017 cm$^3$/g, respectively.

The methods disclosed herein also form robust hollow silica spheres having desirable mechanical strength that resist rupture when placed under certain stresses, and this can be seen for example in the uniformity of the hollow silica sphere produced (FIG. 2). One way to test the mechanical strength is to subject the hollow silica spheres to ultrasonication for 5-10 min at a frequency of 5-30 kHz, preferably 10-25 kHz, preferably 15-20 kHz, and with a power intensity of 25-50 W/cm$^2$, preferably 30-45 W/cm$^2$, preferably 35-40 W/cm$^2$ at 20-25° C. A comparison between the number of broken/ruptured hollow silica spheres before and after the sonication using visual inspection, for example with SEM or TEM images, then provides a measure of mechanical strength, in terms of the percent remaining highly spherical (e.g., having an average sphericity of at least 0.9). In some embodiments, the hollow silica spheres produced by the methods of the present disclosure remain uniform after subjecting to ultrasonication. That is, no more than 10%, preferably no more than 5%, preferably no more than 1% of the distribution of the hollow silica spheres rupture (have a sphericity of less than 0.9) upon prolonged exposure to ultrasonication. This contrasts to most hollow silica spheres produced by template methods, which tend to crater or rupture easily under mechanical stress and thus have the tendency to be non-uniform, i.e., greater than 10% of a population having a different shape (Liu et al. "Preparation of hollow silica spheres with different mesostructures" Journal of Non-Crystalline Solids, 2008, 354, 826-830; Gorsd et al. "Synthesis and Characterization of Hollow Silica Spheres", Procedia Materials Science, 2015, 8, 567-576).

Figure 5:
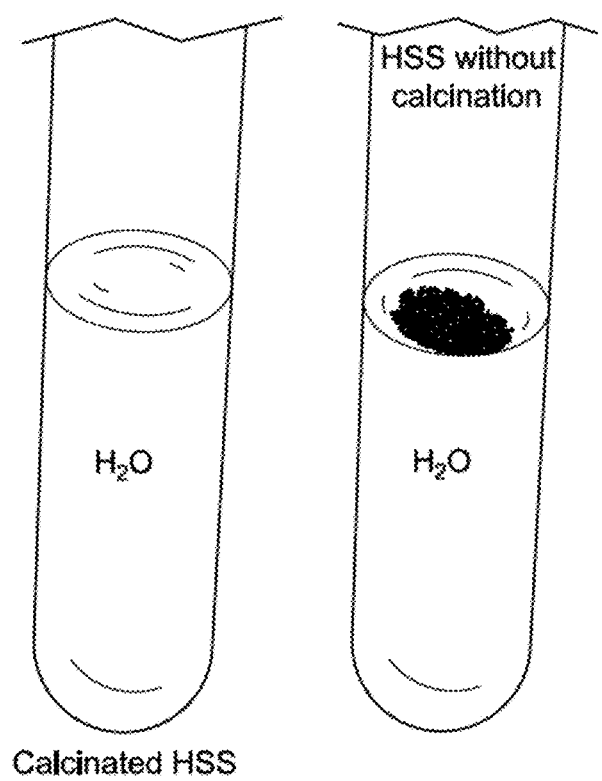
FIG. 5 shows results from a solubility test where the calcined HSS was soluble in water while non-calcined silica particles were hydrophobic in nature, and not soluble in water where they can be seen on the surface of the water.
Figure 6A:
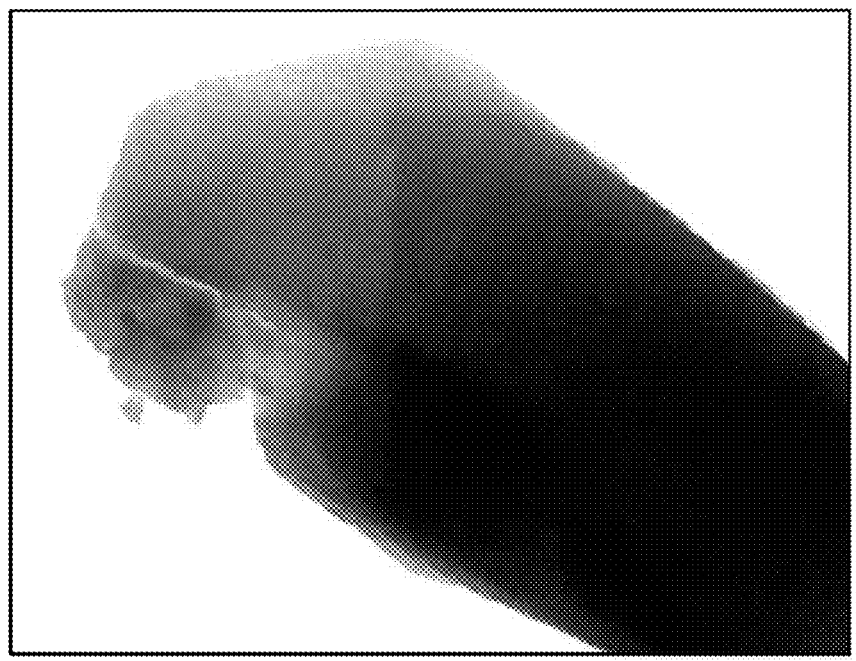
FIGS. 6A-6D shows TEM images of silica particles produced using a single-stage calcination procedure involving heating to to 600° C. with a heating rate of 10° C./min.
Figure 6B:
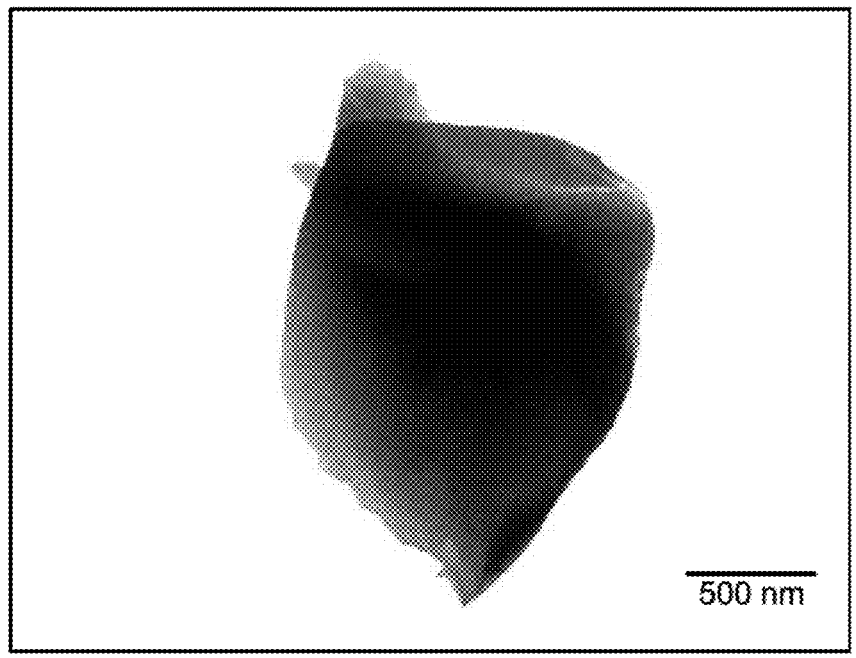
Figure 6C:
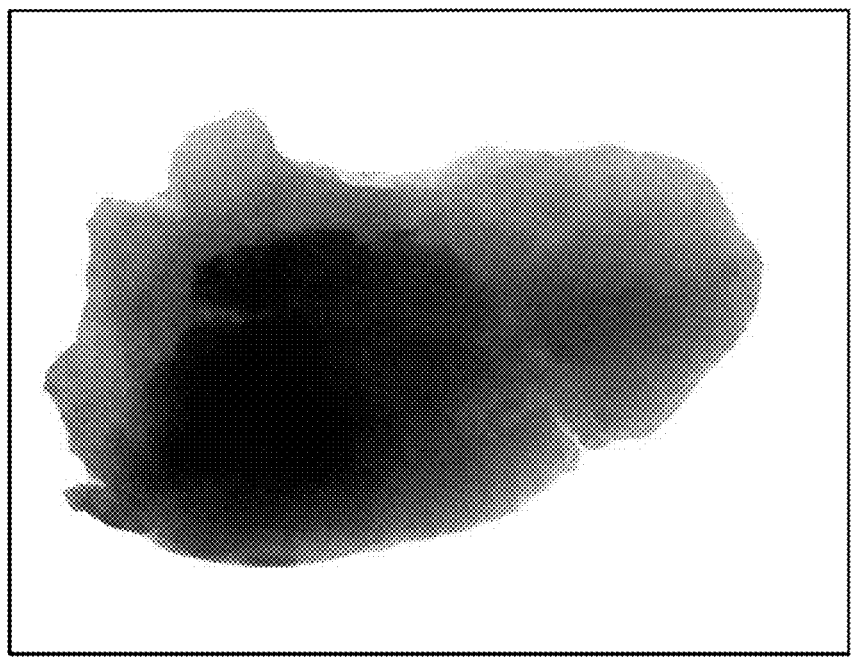
Figure 6D:
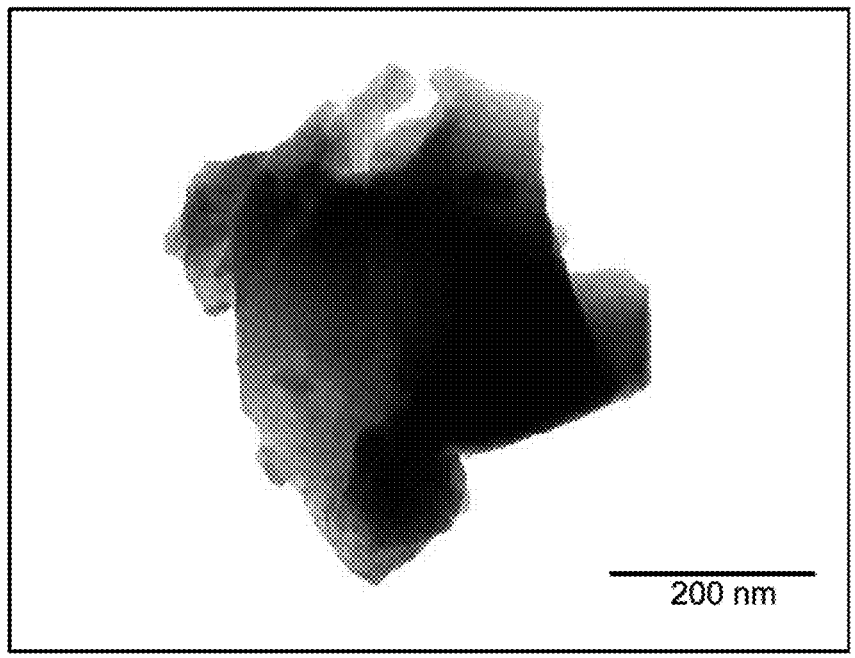

The methods disclosed herein also advantageously produce hollow silica spheres which have at least marginal solubility in water and thus can be used more readily in aqueous-based applications, such as in vivo drug delivery. In some embodiments, the hollow silica spheres have a solubility in water at ambient conditions of 0.1 to 50 mg per 10 mL of water, preferably 0.2 to 45 mg per 10 mL of water, preferably 0.5 to 40 mg per 10 mL of water, preferably 1 to 35 mg per 10 mL of water, preferably 2 to 30 mg per 10 mL of water, preferably 3 to 25 mg per 10 mL of water, preferably 5 to 20 mg per 10 mL of water, preferably 10 to 15 mg per 10 mL of water. Conversely, silica spheres which have not been calcined using the procedures described herein, have limited or no solubility in water under ambient conditions (FIG. 5), with solubilities less than 0.1 mg per 10 mL of water, preferably less than 0.01 mg per 10 mL of water, preferably less than 0.001 mg per 10 mL of water, preferably 0 mg per 10 mL of water. Such low or no aqueous solubility may prohibit the use of non-calcined silica spheres in certain applications such as drug delivery without performing surface modification steps to aid the aqueous solubility, which of course comes at the expense of time, scalability, material throughput, and production cost.

From the above description it is clear that the methods of the present disclosure, which most notably involve use of a hydrolyzable aryl silane and a multi-stage calcining procedure, provide hollow silica spheres having superior uniformity, degrees of hollowness, mechanical properties, aqueous solubility, surface characteristics, etc. compared to non-calcined variants. Further, the inventors have unexpectedly discovered that the particular multi-stage calcining procedures described herein surprisingly provides hollow silica spheres with superior sphericity, degree of hollowness, uniformity, and/or monodispersity, compared to otherwise identical processes using different calcining programs, for example methods employing single-stage calcining procedures. By way of example, when a single-stage calcination procedure (that is, one that involves ramping from one temperature to another at a particular rate without any intermediate holding steps) is employed that involves calcining the precipitate by heating up to 600° C. at a ramp rate of 10° C./min, the resulting product has a low sphericity (e.g., less than 0.9), is not uniform (e.g. more than 10% of the distribution have a different shape), is not substantially hollow (e.g., has a degree of hollowness of less than 2), and has a low monodispersity (has a particle size coefficient of variation of greater than 30%), as can be seen from FIGS. 6A-6D.

This is surprising since the ramping rate and final calcining temperature of the single-stage calcination program are similar to those employed in the multi-stage calcining program of the present disclosure. Without being bound by theory, the superior and unexpected results demonstrated may be because the multi-stage (e.g., two-stage) calcination program provides sufficient time for the aryl groups of the hydrolyzable aryl silane to sequester and orient themselves within the center of the spherical particles, while the silanol functionality aggregate to face the surroundings, akin to the packing behavior of oil-in-water micelles. Therefore, the step-wise temperature increase of the multi-stage program may advantageously allow for reorientation of the hydrophobic and hydrophilic groups while the aryl groups are ultimately being removed through the increasing temperature, thereby forming the hollow core and providing the hollow silica spheres with the aforementioned properties without the need for templates.

The above described advantages enable the hollow silica spheres to be useful in many applications, including drug delivery/carrier applications, biosensors, catalysis, cosmetics, adsorbent applications, fillers in polymer, building, or construction applications, and the like.

In particular, the aqueous solubility properties of the hollow silica spheres allows them to be used directly as a carrier for sustained release of antitumor agents. For example, the hollow silica spheres may be loaded with one or more antitumor agents such as adriamycin, taxol, docetaxel, vincristine sulfate, fluorouracil, methotrexatum, novantrone, cyclic adenosine monophosphate, cyclophosphamide, peplomycin sulfate, nitrocaphane, solazigune, aclarubicin hydrochloride, carmustine, temozolomide, lomustine, carmofur, tegafur, dactinomycin, mitomycin, amsacrine, amifostine, cisplatin, alarelin, aminoglute-thimide, chlormethine hydrochloride, and the like, including derivatives thereof, for combating various types of cancers, including, but not limited to, lung cancer, breast cancer, melanoma, colon cancer, pancreatic cancer, glioma, hepatic tumors, pulmonary tumors, bone tumors, adrenal tumors and other solid tumors. The mode of delivery is not limited and may involve targeted or non-targeted delivery, for example through combination with a targeting agent such as tumor specific folic acid ligand or a tumor specific antibody.

Further, due to the sphericity, degree of hollowness, high surface areas, and porosity, the products formed from the methods disclosed herein are result in small pressure drops, making them especially suitable for adsorptive applications for processing of gases, vapors, liquids and solutions. Accordingly, the hollow silica spheres are useful for various chromatographic applications.

Having generally described this disclosure, a further understanding can be obtained by reference to certain specific examples which are provided herein for purposes of illustration only and are not intended to be limiting unless otherwise specified. The examples below are intended to further illustrate protocols for preparing and testing the hollow silica spheres and they are not intended to limit the scope of the claims.

EXAMPLES

Hydrolysis/Condensation

Silica spheres were obtained from the following hydrolysis/condensation reaction of phenyltrimethoxysilane (PTMS) (FIG. 1), using procedures similar to literature reports [B. P. M. Marini, F. Pilati, and P. Fabbri, *Colloids Surf.*, 2008, A 317, (1-3); Y. Taniguchi, K. Shirai, H. Saitoh, T. Yamauchi and N. Tsubokawa, Polymer, 2005, 46, 2541-2547; H. J. Hah, J. S. Kim, B. J. Jeon, S. M. Koo and Y. E. Lee, Chemical Communications, 2003, 14, 1712-1713— each incorporated herein by reference in their entirety]. In the first step, 0.96 mL of phenyltrimethoxysilane (PTMS) was dissolved in 80 mL of 6.6 mM Nitric acid ($HNO_3$) and stirred and isothermal water bath at (60° C.). The hydrolysis develops rapidly at the adjacency of the PTMS/water interface within 3 minutes of the initial acidic condition. This is followed by the addition of 13.6 mL of ammonium hydroxide (NH$_4$OH) solution (33%) initiated the condensation reaction. The clear mixture solution immediately became a milky solution. The precipitated particles were removed from the condensed solution via centrifugation and then they were washed first with ethanol and then water, respectively. Finally, they were dried at 70° C.

Calcination Procedure to Form HSS 0.1 grams of the above synthesized precipitate based on PTMS was heated in a furnace by the following temperature program: temperature was scanned by 5° C./min up to 200° C. and then it was kept at the same temperature for 30 minutes. Finally, the temperature was increased by 1.5° C./min to 660° C. and held for 16 hours to form the hollow silica spheres.

Morphological Characterization

The morphological features of the prepared silica particles were examined using scanning electron microscopy (SEM) and transmission electron microscopy (TEM). FIG. 2 shows the SEM micrograph of the calcinated specimen prepared through the above method with PTMS. The silica particles were monodisperse and displayed the spherical shape with a smooth and uniform texture. The average size of the spheres was estimated around 515±15 nm, consistent in size and shapes. The spheres displayed the hollow morphology as judged by the contrasts of the core and shell of the spheres.

Figure 3D:
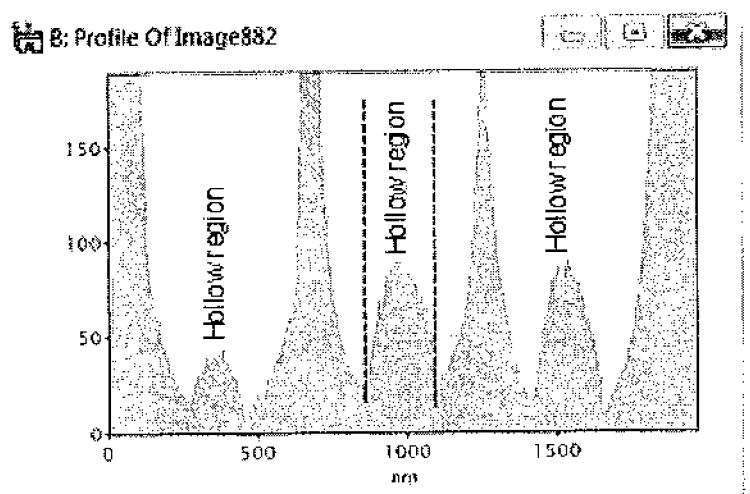
FIG. 3D is an intesity profile taken from the area shown by the line FIG. 3A.

The as prepared silica spheres (before and after calcination) were further analyzed by TEM. FIG. 3A shows a TEM micrograph of HSS before calcination. The morphology of the spheres is consistent with the morphology observed by SEM. However, the size of the spheres seems to be bigger than the size of the spheres after the calcination (FIG. 3A vs. FIG. 3C). This observation was confirmed when the average size of the uncalcinated spheres was measured (~760 nm). FIG. 3C shows the pure hollow silica spheres after the calcination program (finishing at 660° C.). The spheres appeared smaller in size when they were compared with the uncalcinated spheres, the average size (510 nm) is consistent with SEM measurements. Furthermore, a noticeable contrast between the core and the shell of the spheres was observed in the TEM images, which was more obvious for the calcinated spheres compared to the non-calcined spheres. The cores appeared brighter than the shells indicating the hollow nature of the core. The less dense/hollow regions scatter fewer electrons compared to denser parts and appeared brighter in contrast. The hollow nature of the spheres was further clarified by extracting the intensity profiles of the spheres (FIGS. 3B and 3D). This profile shows a peak in the intensity (increased intensity) in each core of the spheres which is due to the hollow nature of the core. On the other hand, the shells showed a significant decline in the intensity profile due to the solid nature compared to the core of the spheres. These observations are consistent with the conclusions made by SEM (FIG. 2) that the silica particles prepared were of hollow structure. Also, few fractured spheres were seen in these images.

Chemical Analysis and Thermal Stability

The major chemical bonds of the silica and thermal stability of the product were confirmed by Fourier transform spectroscopy (FTIR) and thermal gravimetric analysis (TGA), respectively. Prior to calcination, FIG. 4A shows a strong absorption peak at 1130 cm$^{-1}$ that can be attributed to Si—O—Si asymmetric stretching. The peaks located at 728 and 489 cm$^1$ are due to symmetric stretching vibration of Si—O units, and the absorption at 968 cm$^1$ is due to bending of Si—OH. A weak distinctive Si—OH stretching vibration was displayed at about 3600 cm$^1$. The peak at 3100 cm$^1$ belongs to asymmetrical stretching vibration of CH groups of aromatic phenyl attached to HSS. These results demonstrated condensation product of PTMS to form HSS.

After calcination the strong peak at 1081 cm$^1$ belongs to Si—O—Si asymmetric stretching (see FIG. 4B). The peaks at 797 and 444 cm$^1$ are due to the symmetric stretching vibration of Si—O groups. Clearly, all the phenyl groups were removed and the samples include only silica matrix in HSS.

Figure 4C:
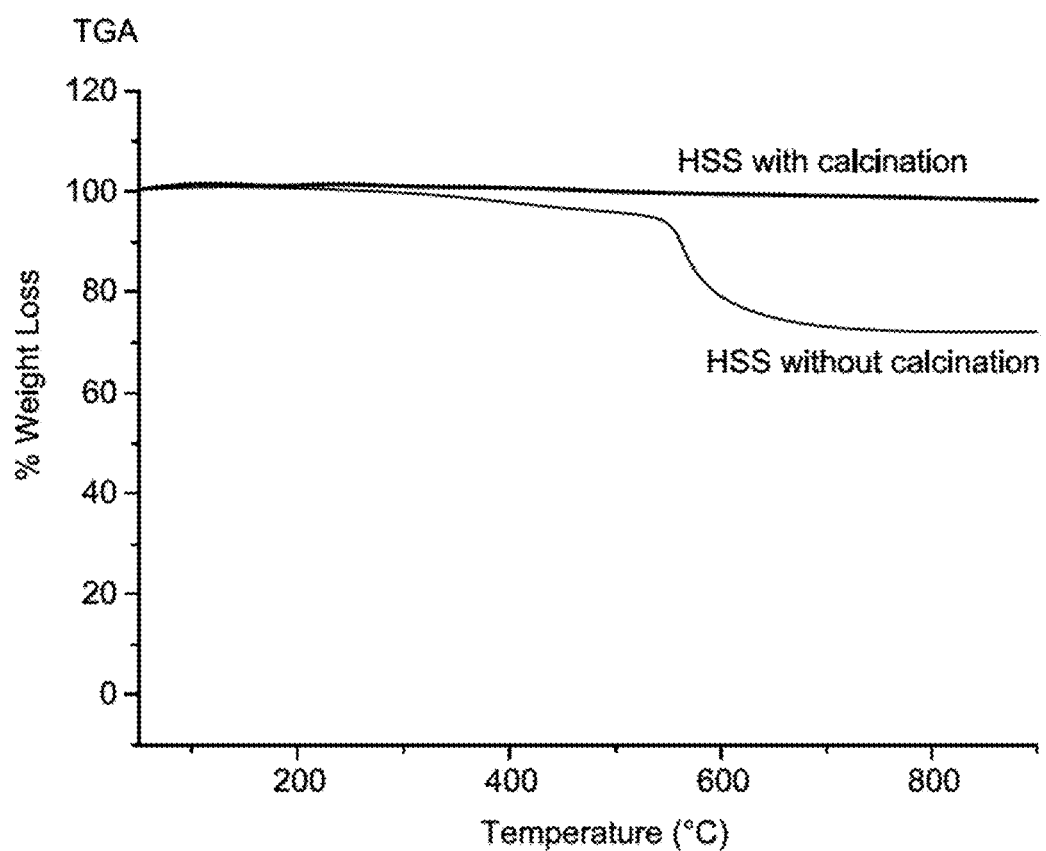
FIG. 4C shows a TGA analysis of non-calcined and calcined HSS samples.

TGA plots show the thermograms of calcinated and non-calcinated HSS. The hollow silica spheres (HSS) before calcination were stable only under 600° C. while the HSS were much more stable after calcination (FIG. 4C). HSS with calcination: no weight loss. Slight weight loss at low T<100° C. is humidty. HSS without calcination: weight loss at around 500° C. is due to loss of phenyl groups. It is clear by FIG. 4C that the sample without calcination exhibited a single step degradation starting at 400° C., corresponding to a loss of phenyl groups which is about 20% of the total weight. The calcinated sample shows no weight change up to 900° C.

Solubility

When a soluble test was conducted for both calcinated and non-calcinated products, only the calcinated spheres were soluble in water. Uncalcinates were hydrophobic in nature due to the presence of phenyl groups and float on the surface of the water (FIG. 5), consistent with previous reports [H. J. Hah, J. S. Kim, B. J. Jeon, S. M. Koo and Y. E. Lee, Chemical Communications, 2003, 14, 1712-1713—incorporated herein by reference in its entirety]. The calcinated product was soluble in water, a property achieved for the first time, which may open many research opportunities for bio-medical applications.

Surface Area Analysis

Surface area analysis was conducted on a micrometrics ASAP 2020 plus instrument using the following parameters:

Non-calcined product—0.1219 g sample mass, 49.6289 cm$^3$ cold free space, N$_2$ analysis adsorptive, −195.725° C. analysis bath temperature, 17.0334 cm$^3$ measured warm free space, 10 s equilibration interval, using nitrogen on silica-alumina reference material;

Calcined product—0.1109 g sample mass, 48.3405 cm$^3$ cold free space, N$_2$ analysis adsorptive, −195.734° C. analysis bath temperature, 16.5409 cm$^3$ measured warm free space, 10 s equilibration interval, using nitrogen on silica-alumina reference material.

BET analysis is readily used to precisely measure the specific surface area (A$_{SS}$) of the porous materials. In this study, the BET analysis was performed to measure the A$_{SS}$ of calcined and un-calcined hollow silica spheres (HSS). The uncalcined product showed A$_{SS}$ value around 4.8 while calcined HSS around 406.4 m$^2$/g. The measured A$_{SS}$ of calcined HSS is around 100 times higher than HSS before calcination (Table 1). The Langmuir Surface Area was found around 8 and 635 m$^2$/g for non-calcined and calcined products, respectively. The non-calcinated sample adsorption average pore diameter (4V/A by BET): 10.1790 nm and that of calcinated one is 2.2396 nm. These data are in agreement with TEM results where the size decreased from ~700 nm to 500 nm due to shrinkage upon calcination.

TABLE 1

BET surface Area data for calcined and non-calcined HSS

| Sample | Specific Surface Area $A_{ss}$ (m²/g) | Langmuir Surface Area $A_{Ls}$ (m²/g) | t-Plot external surface area $A_{es}$ (m²/g) | Pore volume* BJH (cm³/g) |
|---|---|---|---|---|
| Non-calcined HSS | 4.7865 | 7.9261 | 5.5845 | 0.016025 |
| Calcined HSS | 406.4764 | 635.34 | 58.4453 | 0.027569 |

*Cumulative pore volume based on pores having a width between 1.7-300 nm

Comparative Example

Precipitates were prepared by the hydrolysis/condensation reactions as described above and then subjected to the following single-stage calcination procedure: heated up to 600° C. with a heating rate of 10° C./min. FIGS. 6A-6D shows a sampling of the product produced. As can be seen from these figures, the products formed are of varying sizes (not monodisperse) and shapes with low sphericity (angular) and no hollow structure.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present invention is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for forming hollow silica spheres, the method comprising:
    dissolving a hydrolyzable aryl silane in an aqueous solution comprising water and an acid to form a hydrolyzed silane solution;
    mixing the hydrolyzed silane solution with a hydroxide base to form a precipitate; and
    calcining the precipitate to form the hollow silica spheres, wherein the calcining is performed by
        heating to a first temperature of 180 to 240° C. with a first ramp rate of 3 to 10° C./min and holding the first temperature for 2 minutes to 2 hours, then
        heating to a second temperature of 600 to 740° C. at a second ramp rate of 0.1 to 4° C./min, and holding the second temperature for 2 to 24 hours,
    wherein a template is not employed for forming the hollow silica spheres.

2. The method of claim 1, wherein the hydrolyzable aryl silane is a trialkoxyarylsilane.

3. The method of claim 1, wherein the hydrolyzable aryl silane is trimethoxyphenylsilane.

4. The method of claim 1, wherein the acid is nitric acid.

5. The method of claim 1, wherein the hydroxide base is ammonium hydroxide.

6. The method of claim 1, wherein the first temperature is 195 to 210° C.

7. The method of claim 1, wherein the first ramp rate is 4 to 6° C./min.

8. The method of claim 1, wherein the first temperature is held for 15 to 45 minutes.

9. The method of claim 1, wherein the second temperature is 650 to 670° C.

10. The method of claim 1, wherein the second ramp rate is of 1 to 2° C./min.

11. The method of claim 1, wherein the second temperature is held for 12 to 20 hours.

12. The method of claim 1, wherein the hollow silica spheres comprise a silica-containing shell surrounding a core, wherein the silica-containing shell has a higher density of silica compared to the core.

13. The method of claim 12, wherein the hollow silica spheres have an average degree of hollowness, defined as a maximum peak intensity of the core divided by a minimum peak intensity of the silica-containing shell, each measured with transmission electron microscopy, of 3 to 8.

14. The method of claim 12, wherein the silica-containing shell has a thickness of about 150 to 210 nm, and the core has a diameter of about 100 to 230 nm.

15. The method of claim 1, wherein the hollow silica spheres have an average diameter of 500 to 530 nm.

16. The method of claim 15, wherein the hollow silica spheres are monodisperse with a coefficient of variation, defined as a ratio of the standard deviation to the mean diameter of the hollow silica spheres, of less than 5%.

17. The method of claim 1, wherein the hollow silica spheres have a solubility in water of 0.1 to 50 mg per 10 mL of water.

18. The method of claim 1, wherein the hollow silica spheres have a specific surface area of 350 to 450 m²/g.

19. The method of claim 1, wherein the hollow silica spheres have an average pore diameter of 1.7 to 8 nm with a cumulative pore volume of 0.02 to 0.035 cm³/g.

* * * * *